Feb. 14, 1956     W. H. GILLE     2,735,051
ELECTRONIC MOTOR CONTROL APPARATUS
Filed April 9, 1952
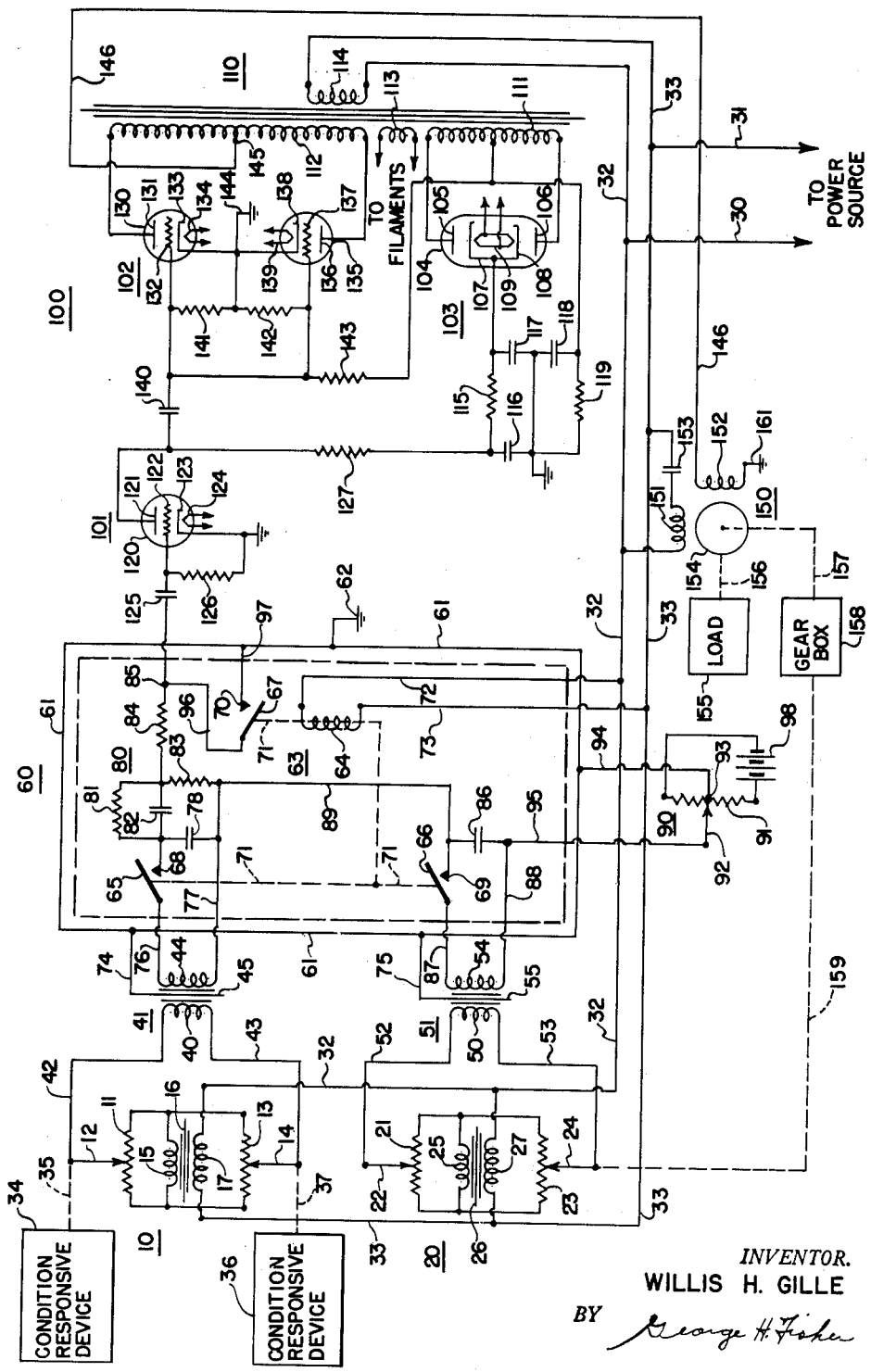
INVENTOR.
WILLIS H. GILLE
BY George H. Fisher
ATTORNEY

United States Patent Office 2,735,051
Patented Feb. 14, 1956

2,735,051
ELECTRONIC MOTOR CONTROL APPARATUS

Willis H. Gille, St. Paul, Minn., assignor to Minneapolis-Honeywell Regulator Company, Minneapolis, Minn., a corporation of Delaware Application April 9, 1952, Serial No. 281,376

8 Claims. (Cl. 318—29)

The present invention relates to electronic motor control systems wherein the motor is controlled in accordance with a plurality of variable voltages which are dependent upon the changes of a plurality of conditions. In systems of this type, the means to produce these voltages are often remote from each other and from the amplifier and from the controlled motor. With an arrangement of this type, it is difficult to avoid stray signals which may cause erratic operation of the motor. Furthermore, systems of this type usually employ alternating signal voltages because of their flexibility in regard to transmission and amplification. However, alternating voltages have the disadvantage of not being readily adaptable to the addition of rate signals for anti-hunting motor operation without the use of complex circuits.

It is an object of the present invention to retain the advantages of using alternating signal voltages in a motor control system of the type described above, without having to suffer from the disadvantages of using alternating signal voltages as described above.

A further object of the present invention is to provide a motor control system in which a plurality of alternating voltage signals are modified and combined to form a single signal and in which out of phase signals are eliminated.

Another object of the present invention is to provide a motor control system in which a plurality of alternating voltage signals are modified and combined to form a single signal and in which a rate signal is added to at least one of the modified signals before combination with the other signals.

In addition to above objects it is an object of the present invention to provide a motor control system of the type described above, in which a balanced condition is obtained by modification of one of said signals through the operation of the motor.

The above objects are specifically accomplished by introducing all of the signals into a shielded box, rectifying each signal, producing rate signals, combining all the signals, and reconverting the combined signal to an alternating voltage by the use of a synchronous vibrator.

Other objects and advantages of the invention will be apparent and a complete understanding of the invention will be had from a consideration of the appended claims, specification, and the drawing in which a preferred embodiment of the invention is illustrated.

Referring to the drawing, numerals 10 and 20 designate two balanceable networks. Balanceable network 10 consists of a potentiometer 11 having a slider 12 and a potentiometer 13 having a slider 14 connected in parallel with each other across secondary winding 15 of a transformer 16 having a primary winding 17. Balanceable network 20 consists of a potentiometer 21 having a slider 22 and a potentiometer 23 having a slider 24 connected in parallel with each other across secondary winding 25 of a transformer 26 having a primary winding 27. Primary winding 17 of transformer 16 and primary winding 27 of transformer 26 are connected in parallel with each other, and are energized from power lines 30 and 31 through conductors 32 and 33.

Balanceable network 10 is unbalanced through the action of condition responsive device 34 on slider 12 of potentiometer 11 through mechanical connection 35, or through the action of condition resopnsive device 36 on slider 14 of potentiometer 13 through mechanical connection 37, or through the action of both. In a particular application of the invention, for example an automatic pilot system, potentiometer 11 could be operated by the directional gyroscope and potentiometer 13 could be operated by the roll axis of the vertical gyroscope. Balanceable network 20 can be unbalanced either by adjustment of potentiometer 21, or of potentiometer 23, or by the adjustment of both. In such an automatic pilot system, the networks could control the energization of a rudder servomotor and potentiometer 21 could be the rudder trim potentiometer and potentiometer 23 could be the rebalancing potentiometer actuated by the rudder servomotor.

Numeral 90 designates a voltage divider having a winding 91 center tapped at 93 and a slider 92. Winding 91 of voltage divider 90 is energized by a battery or other suitable source 98. Center tap 93 of winding 91 is connected to ground terminal 62 through conductor 94 and shield 61. In an automatic pilot system voltage divider 90 can be the pilot's manual turn control.

The output voltages of balanceable network 10 are applied to primary winding 40 of the transformer 41 through conductors 42 and 43. Transformer 41 also has a secondary winding 44 and an electrostatic shield 45. The output voltages of balanceable network 20 are applied to primary winding 50 of a transformer 51 through conductors 52 and 53. Transformer 51 also has a secondary winding 54 and a shield 55. Any unidirectional output voltage from voltage divider 90 is superimposed on the output voltage from secondary winding 54 of transformer 51, by connecting the lower terminal of winding 54 to slider 92 of voltage divider 90 through conductors 88 and 95.

Numeral 60 designates an enclosure completely surrounded by a shield 61, which is grounded at 62. Enclosure 60 contains a synchronous vibrator 63 having a winding 64, movable contacts 65, 66, and 67, and fixed contacts 68, 69, and 70. Synchronous vibrator 63 also has an armature 71, which alternately engages and disengages movable contacts 65, 66, and 67 with fixed contacts 68, 69, and 70 respectively. Winding 64 of synchronous vibrator 63 is energized from the power lines 30 and 31 through conductors 32, 72, 73, and 33. Also contained within enclosure 60 are filter and rate networks, which will be explained later.

Shield 45 of transformer 41 is connected to ground 62 through shield 61 of enclosure 60. Shield 55 of transformer 51 is connected to ground 62 through shield 61 of enclosure 60 and conductor 75.

The output voltages from secondary winding 44 of transformer 41 are connected to movable contact 65 of synchronous vibrator 63 and filter capacitor 78 through conductors 76 and 77, where they are periodically interrupted and then filtered to form a unidirectional voltage which is applied to rate network 80. Rate network 80 modifies the unidirectional voltage in accordance with its rate of increase or decrease. Rate network 80 consists of a resistor 81, a capacitor 82, and a resistor 83. The modified unidirectional voltage is developed across resistor 83 and consists of a component proportional to the magnitude of the unidirectional voltage as well as the component proportional to the rate of the unidirectional voltage. This is due to the fact that a portion of the unidirectional voltage is shunted around the rate capacitor 82 by resistor 81. The modified unidirectional voltage appearing across resistor 83 is then applied to output terminal 85 through resistor 84.

The output voltage from secondary winding 54 of transformer 51 is alternately interrupted and applied to filter capacitor 86 through conductors 87, contacts 66 and 69 of synchronous vibrator 63, and conductor 88 to form a filtered unidirectional voltage, which is applied to output terminal 85 through resistors 84 and 83 and conductor 89.

Since all the voltages appearing at output terminal 85 of enclosure 60 are unidirectional voltages, a resultant unidirectional voltage is formed by their addition. This resultant unidirectional voltage is converted to a pulsating unidirectional voltage through the action of synchronous vibrator 63, which alternately opens and closes the connection between terminal 85 and ground 62. This connection consists of conductor 96, movable contact 67, fixed contact 70, conductor 97, shield 61, and ground 62.

Numeral 100 designates the amplifying portion of the embodiment and consists of a voltage amplification stage 101, a discriminator stage 102, and a power supply 103.

Power supply 103 consists of a full wave rectifier tube 104 having anodes 105 and 106 and cathodes 107 and 108 respectively and a filament 109. The anode potentials for twin diode 104 are supplied by a center tapped secondary winding 111 of a transformer 110, which also has a center tapped secondary winding 112, a secondary winding 113, and a primary winding 114. Primary winding 114 is energized from the power lines 30 and 31 through conductors 32 and 33. The filament 109 of rectifier tube 104 may be energized by secondary winding 113 of transformer 110. The power supply 103 supplies a positive anode voltage for the voltage amplification stage 101, which is passed through a filter consisting of a resistor 115 and filter capacitors 116 and 117. Power supply 103 also supplies a negative biasing voltage for discriminator stage 102, which is filtered by capacitor 118 and resistor 119.

Voltage amplification stage 101 consists of a triode 120 having an anode 121, a control electrode 122, a cathode 123, and a filament 124. Associated with the triode 120 is a coupling capacitor 125, a grid biasing resistor 126, and an anode load resistor 127. The filament 124 of triode 120 may be energized by secondary winding 113 of transformer 110.

Discriminator stage 102 is a conventional biased half-wave discriminator consisting of a triode 130 having an anode 131, a control electrode 132, a cathode 133, and a filament 134 and a triode 135 having an anode 136, a control electrode 137, a cathode 138, and a filament 139. Associated with discriminator stage 102 is a coupling capacitor 140, grid bias resistor 141, and grid bias resistor 142. A negative biasing voltage is applied to the control electrodes 132 and 137 of triodes 130 and 135 respectively from the power supply 103 through a resistor 143. The anode potentials for triodes 130 and 135 are supplied by center tapped secondary winding 112 of transformer 110. The filaments 134 and 139 of triodes 130 and 135 respectively may be energized by secondary winding 113 of transformer 110.

Numeral 150 designates a motor having a power winding 151, a control winding 152, and an armature 154. Power winding 151 is energized from the power lines 30 and 31 through conductors 32 and 33 and phasing capacitor 153. The control winding 152 is energized from the output terminals of the discriminator stage 102, cathode ground connection 144 and center tap 145 of secondary winding 112, through a conductor 146. The armature 154 drives a load 155 through a mechanical connection 156, and also drives slider 24 of rebalancing potentiometer 23 through mechanical connection 157, gear box 158 and mechanical connection 159. In an automatic pilot system, the load device 155 could be the rudder of the aircraft, as previously noted.

*Operation*

An unbalanced condition occurs when one or more of the sliders of the potentiometers associated with balanceable networks 10 and 20 and voltage divider 90 are displaced from their null positions. With an unbalance occurring in balanceable network 10, the voltage will be applied to primary winding 40 of transformer 41 through conductors 42 and 43 and will be induced in secondary winding 44 of transformer 41. When an unbalanced condition appears in balanceable network 20, an alternating voltage will be applied to primary winding 50 of the transformer 51 through conductors 52 and 53 and will be induced in secondary winding 54 of transformer 51. The output voltage of secondary winding 44 of transformer 41 is rectified through the synchronous operation of movable contact 65 and fixed contact 68 of synchronous vibrator 63 and is filtered by capacitor 78 to appear as a unidirectional voltage. The output voltage from secondary winding 54 of transformer 51 is rectified through the synchronous action of movable contact 66 and fixed contact 69 of synchronous vibrator 63 and is filtered by capacitor 86 to appear as a unidirectional voltage. The action of the rectifying contacts of synchronous vibrator 63, as stated above, performs two functions. The primary function is to convert the alternating output voltages from transformers 41 and 51 to unidirectional voltages. The secondary function is to reduce the quadrature signals and other extraneous induced voltages, which may be picked up in the balanceable network and the signal voltage leads, to a minimum. This secondary function of vibrator rectifiers is well known in the art. In an automatic pilot system the various potentiometers of voltage divider 90 and balanceable bridge networks 10 and 20 are often placed at points remote from each other and also remote from the amplifier. For example, potentiometer 11 and its associated wiper 12, which can be operated by the directional gyroscope, would be placed near the gyroscope, which is often placed in the nose of the aircraft. Potentiometer 13 and its associated slider 14, which can be operated by the roll axis of the vertical gyroscope, is placed near the vertical gyroscope, which in turn is usually placed near the center of gravity of the aircraft. Potentiometer 21 and its associated slider 22, which can be the rudder trim potentiometer, is usually placed in the pilot's compartment. Potentiometer 23 and its associated slider 24 can be the rebalancing potentiometer for the system, in which case it would be placed near the rudder servomotor near the rear end of the fuselage of the aircraft. Voltage divider 90 and its associated winding 91 and slider 92 can be the pilot's turn control, in which case it would be placed in the pilot's compartment. The amplifier itself is placed wherever it is most convenient in regard to the standpoint of available space. Therefore, from the remote positions of the various elements in the system it can be seen that there is a very great chance of picking up quadrature signals and other extraneous voltages, which will accompany the wanted signals. If quadrature signals or other extraneous voltages inherent in a motor control system are not eliminated or substantially reduced, erratic operation of the motor will result. Therefore, it can be seen that the use of a synchronous rectifier, which produces substantial reduction of induced quadrature signals and other extraneous signals, gives rise to more accurate and reliable motor operation. The function of shield 61 of enclosure 60, as well as the grounded shield of transformers 41 and 51, is to prevent further induction of extraneous signals.

The unidirectional voltage appearing across capacitor 78 is then passed through a rate network 80 to insure anti-hunting operation of the motor 150. Rate network 80 consists of a resistor 81, a capacitor 82, and a resistor 83. The rate network 80 modifies the unidirectional signal in accordance with its rate of increase or decrease in a manner well known in the art, and is then applied to output terminal 85 of enclosure 60 through a resistor 84. The unidirectional voltage appearing across capacitor 86 is also applied to output terminal 85 of enclosure 60 through conductor 89, resistor 83, and resistor 84. It is not necessary to pass the unidirectional voltage appearing at capacitor 86 through a rate network to prevent anti-hunting motor operation, since the voltage appearing at this point does not vary rapidly enough to cause the motor 150 to hunt. Any displacement of slider 92 from center tap 93 on potentiometer 91 will cause a unidirectional voltage to be superimposed on the output voltage from secondary winding 54 of transformer 51 through a conductor 95, and is also effectively applied to output terminal 85 of enclosure 60 through conductor 89, resistor 83, and resistor 84. The resultant unidirectional voltage appearing at output terminal 85 of enclosure 60 is then converted to a pulsating unidirectional voltage through the action of conductor 96, and movable contact 67 and grounded fixed contact 70 of synchronous vibrator 63.

Since the various alternating control signals may result from networks which are remote from each other and from the amplifier and from the controlled motor, extraneous signals may be induced into the conductors transmitting the desired signals to the amplifier and be transmitted to the amplifier along with the desired signal, which may cause erratic operation of the controlled motor. However, since all the signals are chopped to a half wave rectified signal and filtered to form a smooth unidirectional voltage and rechopped to a pulsating unidirectional voltage before the signals are applied to the amplifier, and since the chopping and rechopping actions are performed in synchronism with the power supply frequency, the resulting signal, which is applied to the amplifier, contains in effect only the wanted signals. Because of the synchronism of the chopping and rechopping actions, the extraneous signals are lost. Actually, the peaks of the pulsating unidirectional voltage may be affected slightly, but not to an extent to prevent reliable operation of the motor.

This pulsating unidirectional voltage is applied to voltage amplification stage 101 through a coupling capacitor 125 and appears on control electrode 122 of triode 120 as an alternating voltage having the same frequency as the various alternating input signals through the action of synchronous vibrator 63 and condenser 125.

The signal is then amplified in triode 120 and is coupled to control electrodes 132 and 137 of triodes 130 and 135 respectively through a coupling capacitor 140. Since discriminator stage 102 is of the half-wave type, either triode 130 or triode 135 will conduct on opposite half cycles, depending upon the phase of the input signal, while the other triode is substantially non-conductive for both half cycles. An output voltage will then be developed between cathode ground connection 144 and center tap 145 of secondary winding 112 of transformer 110. This output voltage will then be connected to control winding 152 of motor 150 from center tap 145, conductor 146, winding 152, ground connection 161, and back to cathode ground connection 144. The motor 150 will then operate in one direction or the other, dependent upon the phase of the output voltage from discriminator stage 102, to actuate the load 155 through mechanical connection 156 and will also rebalance the system by moving slider 24 of potentiometer 23 through mechanical connection 157, gear box 158, and mechanical connection 159. Assuming that slider 92 is positioned at center tap 93 on potentiometer 91 of voltage divider 90 so that the lower terminal of capacitor 86 is at ground potential, it can be seen that by the proper movement of slider 24 of potentiometer 23 a voltage of the proper phase and magnitude will be induced in secondary winding 54 of transformer 51, which will be rectified by contacts 66 and 69 of synchronous vibrator 63, to form a unidirectional voltage of the proper sense and magnitude to reduce the resultant unidirectional voltage appearing at output terminal 85 of enclosure 60 to a minimum value, so that no output voltage will appear between cathode ground connection 144 and center tap 145 of secondary winding 112 in discriminator stage 102. Slider 92 of potentiometer 91 of voltage divider 90 can be assumed to be in the grounded or neutral position, since it is merely the pilot's turn control and is always left in the neutral or grounded position when not in use.

While I have shown and described an embodiment of my invention, it is to be understood that this is for purposes of illustration only and that my invention is to be limited only by the scope of the appended claims.

I claim as my invention:

1. Motor control apparatus comprising in combination: a plurality of sources of alternating voltage of variable magnitude; motor means to be positioned in accordance with the algebraic sum of said alternating voltages; means for rectifying and filtering each of said alternating voltages to form unidirectional voltages having magnitudes dependent upon the magnitudes of the corresponding alternating voltages; means combining said unidirectional voltages together to form a resultant unidirectional voltage; means for periodically interrupting said resultant voltage to form an output voltage with an alternating current component; and means for amplifying said output voltage and for controlling the operation of said motor means.

2. Motor control apparatus comprising in combination: a plurality of sources of alternating voltage variable in magnitude in accordance with different conditions, at least two of said sources being located at points remote from each other; motor means to be positioned in accordance with the algebraic sum of said alternating voltages; means for rectifying and filtering each of said alternating voltages to form unidirectional voltages having magnitudes dependent upon the magnitudes of the corresponding alternating voltages; means combining said unidirectional voltages together to form a resultant unidirectional voltage; means for periodically interrupting said resultant unidirectional voltage to form an output voltage with an alternating current component, said interrupting means being in synchronism with said rectifying means; and means for amplifying said output voltage and for controlling the operation of said motor means.

3. Motor control apparatus comprising in combination: a plurality of sources of alternating voltage of variable magnitude; a source of unidirectional voltage of variable magnitude; means for rectifying one of said alternating voltages to form a unidirectional voltage having a magnitude dependent upon the magnitude of the alternating voltage, and means modifying said rectified voltage in accordance with its rate of change; means for rectifying the remaining of said alternating voltages to form unidirectional voltages having magnitudes dependent upon the magnitudes of the corresponding alternating voltages; means combining the output voltage from said unidirectional voltage source together with said rectified voltages to form a resultant unidirectional voltage; motor means operative to vary the voltage from at least one of said sources so as to reduce said resultant voltage to a minimum; means for periodically interrupting said resultant unidirectional voltage to form an output voltage with an alternating current component; a shielded enclosure housing said rectifying means, said combining means, and said interrupting means; and means for amplifying said output voltage and for controlling the operation of said motor means.

4. Motor control apparatus comprising in combination: a plurality of sources of alternating voltage of variable magnitude, at least two of said sources being located at points remote from each other; motor means to be positioned in accordance with the algebraic sum of said alternating voltages; means for rectifying and filtering each of said alternating voltages to form unidirectional voltages having magnitudes dependent upon the magnitudes of the corresponding alternating voltages; means modifying at least one of said rectified voltages in accordance with its rate of change; means combining the remaining unidirectional voltages and said modified voltage together to form a resultant unidirectional voltage; means for periodically interrupting said resultant unidirectional voltage to form an output voltage with an alternating current component; a shielded enclosure housing said rectifying means, said combining means, and said interrupting means; and means for amplifying said output voltage and for controlling the operation of said motor means.

5. Motor control apparatus comprising in combination: a plurality of sources of alternating voltage of variable magnitude, at least two of said sources being located at points remote from each other; motor means to be positioned in accordance with the algebraic sum of said alternating voltages; means for rectifying and filtering each of said alternating voltages to form unidirectional voltages having magnitudes dependent upon the magnitudes of the corresponding alternating voltages, said rectifying and filtering means also being effective to reduce any extraneous induced voltages accompanying the voltages from said sources to a minimum; means modifying one of said unidirectional voltages in accordance with its rate of change; means combining said modified unidirectional voltage and the remaining of said unidirectional voltages together to form a resultant unidirectional voltage; means for periodically interrupting said resultant unidirectional voltage to form an output voltage with an alternating current component; a shielded enclosure housing said rectifying means, said combining means, and said interruputing means to prevent further extraneous voltages from being induced during the operation of said rectifying, combining, and interrupting means; and means for amplifying said output voltage and for controlling the operation of said motor means.

6. Motor control apparatus comprising in combination: a plurality of sources of alternating voltage reversible in phase and variable in magnitude in accordance with variable conditions; a source of unidirectional voltage reversible in sense and variable in magnitude in accordance with a variable condition; means rectifying and filtering each of said alternating voltages to form unidirectional voltages having magnitudes and senses dependent upon the magnitudes and phases of the corresponding alternating voltages, said rectifying and filtering means also being effective to reduce to a minimum extraneous induced voltages accompanying the voltages to be rectified and in phase quadrature with the voltages to be rectified; means combining all of said unidirectional voltages together to form a resultant unidirectional voltage; means for periodically interrupting said resultant voltage to form an output voltage with an alternating current component; a shielded enclosure housing said rectifying means, said combining means, and said interrupting means to prevent further extraneous voltages from being induced during the operation of said rectifying, combining, and interrupting means; and means for amplifying said output voltage and for controlling the operation of a motor.

7. Motor control apparatus comprising in combination: a plurality of sources of alternating voltage reversible in phase and variable in magnitude in accordance with variable conditions; a source of unidirectional voltage reversible in sense and variable in magnitude in accordance with a variable condition; means rectifying and filtering each of said alternating voltages to form unidirectional voltages having magnitudes and senses dependent upon the magnitudes and phases of the corresponding alternating voltages, said rectifying and filtering means also being effective to reduce to a minimum extraneous induced voltages in phase quadrature with the voltages to be rectified; means modifying at least one of said rectified voltages in accordance with its rate of change; means combining all the remaining unidirectional voltages and said modified voltage together to form a resultant unidirectional voltage; means for periodically interrupting said resultant voltage to form an output voltage with an alternating current component; a shielded enclosure housing said rectifying means, said combining means, and said interrupting means to prevent further extraneous voltages from being induced during the operation of said rectifying, combining, and interrupting means; and means for amplifying said output voltage and for controlling the operation of a motor.

8. Motor control apparatus comprising in combination: a plurality of sources of alternating voltage reversible in phase and variable in magnitude in accordance with variable conditions; a source of unidirectional voltage reversible in sense and variable in magnitude in accordance with a variable condition; means rectifying and filtering each of said alternating voltages to form unidirectional voltages having magnitudes and senses dependent upon the magnitudes and phases of the corresponding alternating voltages, said rectifying and filtering means also being effective to reduce to a minimum extraneous induced voltages in phase quadrature with the voltages to be rectified; means combining all of said unidirectional voltages together to form a resultant unidirectional voltage; means for periodically interrupting said resultant voltage to form an output voltage with an alternating current component, said interrupting means being in synchronism with said rectifying means; a shielded enclosure housing said rectifying means, said combining means, and said interrupting means to prevent further extraneous voltages from being induced during the operation of said rectifying, combining, and interrupting means; and means for amplifying said output voltage and for controlling the operation of a motor, said motor being operative to vary the voltage from at least one of said sources in order to reduce said resultant unidirectional voltage to a minimum.

References Cited in the file of this patent

UNITED STATES PATENTS

| | | |
|---|---|---|
| 2,409,970 | Agins | Oct. 22, 1946 |
| 2,479,105 | Emerson | Aug. 16, 1949 |
| 2,481,562 | Bailey | Sept. 13, 1949 |
| 2,536,850 | Kutzler | Jan. 2, 1951 |
| 2,584,954 | Williams, Jr. | Feb. 5, 1952 |
| 2,597,789 | McGoldrick | May 20, 1952 |

OTHER REFERENCES

Publication, "Electronics," April 1950, p. 77.